United States Patent
Luntz et al.

(10) Patent No.: US 7,467,649 B2
(45) Date of Patent: Dec. 23, 2008

(54) AUTOMATIC SHUTOFF REFUELING RECEIVER

(75) Inventors: Matt Luntz, Highland, UT (US); Thomas B. Rose, Downey, CA (US)

(73) Assignee: Adel Wiggins Group, Los Angeles, CA (US)

( * ) Notice: Subject to any disclaimer, the term of this patent is extended or adjusted under 35 U.S.C. 154(b) by 776 days.

(21) Appl. No.: 10/728,832

(22) Filed: Dec. 8, 2003
(Under 37 CFR 1.47)

(65) Prior Publication Data
US 2007/0163672 A1    Jul. 19, 2007

(51) Int. Cl.
*B65B 1/04* (2006.01)
(52) U.S. Cl. .................... 141/352; 141/59; 141/302; 141/346; 141/351
(58) Field of Classification Search .............. 141/59, 141/301, 302, 346–355, 387–389; 220/86.2; 251/149.1
See application file for complete search history.

(56) References Cited

U.S. PATENT DOCUMENTS

| | | | |
|---|---|---|---|
| 3,604,478 A | * | 9/1971 | Gowens ................ 141/59 |
| 4,006,762 A | | 2/1977 | Badger et al. .............. 141/198 |
| 5,056,570 A | * | 10/1991 | Harris et al. ................ 141/59 |
| 5,285,812 A | | 2/1994 | Morales et al. ............ 137/393 |
| 6,250,348 B1 | * | 6/2001 | Reinholdt ................. 141/382 |
| 7,048,020 B2 | * | 5/2006 | Durieux et al. ............ 141/382 |
| 2003/0131888 A1 | | 7/2003 | Cortez et al. ............... 137/393 |

* cited by examiner

*Primary Examiner*—Timothy L Maust
(74) *Attorney, Agent, or Firm*—Baker & Hostetler LLP

(57) ABSTRACT

A refueling receiver includes an inlet configured to receive a nozzle. A control valve piston is connected to the inlet to allow flow from the inlet to the control valve piston. The control valve piston has an inlet side and an outlet side. An outlet is provided having an outlet fitting and a return fitting. The outlet fitting is connected to the inlet to allow flow from the inlet to the outlet fitting. A sensor is provided having an input connected to the outlet fitting, and an output connected to the return fitting to allow flow from the outlet fitting to said return fitting through the sensor. A pilot valve is in communication with the return fitting to control a pressure differential between the inlet side and the outlet side to move said control valve piston into a first position to allow flow out of the receiver, and a second position to prevent flow from leaving the receiver.

7 Claims, 4 Drawing Sheets

AUTOMATIC SHUTOFF REFUELING RECEIVER

FIELD OF THE INVENTION

The present invention relates generally to receivers used in the refueling process. More particularly, the present invention relates to automatic shutoff refueling receivers.

BACKGROUND OF THE INVENTION

The heavy mining industry, such as open pit mining and coal mining, as well as the construction industry, use specialized, often very large, off-road vehicles. The expense and logistics of using these vehicles requires that they can be refueled quickly and safely from both fixed and mobile refueling platforms. This application concerns itself with the system used on the vehicle whose tank that is being filled.

Typical equipment may include a nozzle, receiver, vent, and level-sensing device. The Nozzle is attached to the hose from the fuel pumps and provides a connection to a receiver, which is attached to the fuel tank. Due to the size of the fuel tanks the most common receiver mounting is near the bottom of the tanks. The most common systems use pressuring vents which, when the tank is full, seal off and raise the internal pressure of the tank as the fuel continues to flow in. The pressure increase then shuts off a pressure sensitive nozzle, stopping the flow. This system has been successfully used for over thirty years.

There are however several problems with pressurizing tanks. First operators tend to "top off" the tanks by forcing open the nozzle and end up spilling fuel on the ground through an overflow valve/vent. Second, there is the remote possibility of complete system failure if the shut off valve and the overflow valve fail at the same time. This could overpressure the tank and cause it to split. Third, vehicle manufactures are making their tanks lighter which usually results in a lower pressure handling capability. Fuel spillage is a major environmental concern and tank failure is a major economic concern. Accordingly, it is desirable to provide a fuel shutoff without having to pressurize the tank

SUMMARY OF THE INVENTION

The foregoing needs are met, to a great extent, by the present invention, wherein in one aspect, a receiver is used as a shutoff device. The present invention is a receiver that can be used in conjunction with existing nozzles and jet sensors. In one embodiment of the invention, the tank is not pressurized. A remote float or jet sensor is used as a level sensor, which signals the receiver to shut off. This is done by either increasing or decreasing a pressure within the receiver. Jet sensors are used as level sensing devices due to their simplicity and reliability. In other cases, float style level sensors are used. However since float sensor have moving parts, they are prone to failure in some cases.

In accordance with one embodiment of the present invention a refueling receiver includes an inlet configured to receive a nozzle. A control valve piston is connected to the inlet to allow flow from the inlet to the control valve piston. The control valve piston has an inlet side and an outlet side. An outlet is provided and includes an outlet fitting and a return fitting. The outlet fitting is connected to the inlet to allow flow from the inlet to the outlet fitting. The return fitting is connected to the outlet fitting to allow flow from the outlet fitting to the return fitting. A pilot valve is in communication with the return fitting to control a pressure differential between the inlet side and the outlet side to move the control valve piston into a first position to allow flow out of the receiver, and a second position to prevent flow from leaving the receiver.

The refueling receiver can further include a sensor connected between the return fitting and the outlet fitting. The sensor can be a jet sensor. The sensor can include an input connected to the outlet fitting and an output connected to the return fitting.

The refueling receiver can further include a connecting rod forming a main body bore connecting the inlet to the outlet fitting.

The pilot valve can be in communication with the outlet side so that flow from the return fitting moves the pilot valve releasing pressure from the outlet side.

In accordance with another embodiment of the present invention, a method for filling a tank includes the steps of receiving fuel at an inlet of a receiver; allowing fuel to flow through the receiver to a control valve piston having an inlet side and an outlet side; allowing fuel to flow from the inlet side to the outlet side; allowing fuel to flow from the inlet to an outlet fitting and back into the receiver through a return fitting; and controlling a pressure differential between the inlet side and the outlet side using the fuel flow from the return fitting.

The method can further include the step of allowing fuel to flow from the outlet fitting through a sensor and back to the return fitting.

The method can also include the step of allowing fuel to flow from the outlet fitting through a jet sensor and back to the return fitting.

In another embodiment of the invention, the method can include the step of allowing fuel to flow from the outlet fitting to an input of a sensor, through an output of the sensor, and back to the return fitting.

In an alternate embodiment of the invention, fuel flows from the inlet to the outlet fitting through a connecting rod forming a main body bore connecting the inlet to the outlet fitting.

The invention can further include the step of moving a pilot valve in communication with the outlet side so that flow from the return fitting moves the pilot valve releasing pressure from the outlet side.

In accordance with another embodiment of the present invention, a system for filling a tank includes a means for receiving fuel at an inlet of a receiver; means for allowing fuel to flow through the receiver to a control valve piston having an inlet side and an outlet side; means for allowing fuel to flow from the inlet side to the outlet side; means for allowing fuel to flow from the inlet to an outlet fitting and back into the receiver through a return fitting; and means for controlling a pressure differential between the inlet side and the outlet side using the fuel flow from the return fitting.

The system can further include a means for of allowing fuel to flow from the outlet fitting through a sensor and back to the return fitting.

The system another embodiment of the invention can further include a means for allowing fuel to flow from the outlet fitting through a jet sensor and back to the return fitting.

In another embodiment of the invention the system can further include a means for allowing fuel to flow from the outlet fitting to an input of a sensor, through an output of the sensor, and back to the return fitting.

In an alternate embodiment of the invention, fuel flows from the inlet to the outlet fitting through a connecting rod forming a main body bore connecting the inlet to the outlet fitting.

The system can further include a means for moving a pilot valve in communication with the outlet side so that flow from the return fitting moves the pilot valve releasing pressure from said outlet side.

In an alternate embodiment of the invention, a refueling receiver includes an inlet configured to receive a nozzle. A control valve piston is connected to the inlet to allow flow from the inlet to the control valve piston. The control valve piston has an inlet side and an outlet side. An outlet is provided having an outlet fitting and a return fitting. The outlet fitting is connected to the inlet to allow flow from the inlet to the outlet fitting. A sensor is provided having an input connected to the outlet fitting, and an output connected to the return fitting to allow flow from the outlet fitting to said return fitting through the sensor. A pilot valve is in communication with the return fitting to control a pressure differential between the inlet side and the outlet side to move said control valve piston into a first position to allow flow out of the receiver, and a second position to prevent flow from leaving the receiver.

The refueling receiver can also include a connecting rod forming a main body bore connecting the inlet to the outlet fitting.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
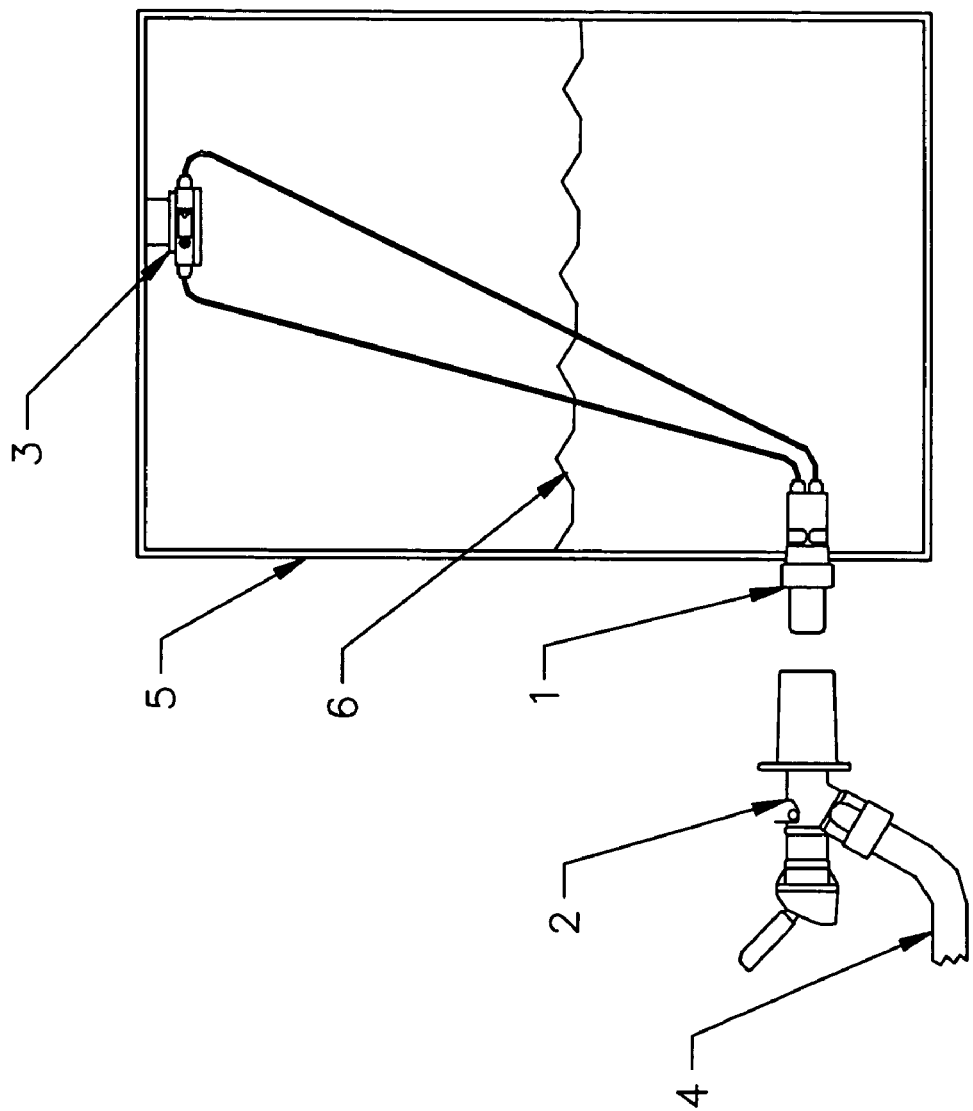
FIG. 1 is an illustration of a refueling system according to one embodiment of the invention.

The invention will now be described with reference to the drawing figures, in which like reference numerals refer to like parts throughout. The present invention, in one embodiment, provides a receiver that functions as a shutoff device. The receiver can be used in conjunction with existing nozzles and jet sensors. A remote float or jet sensor is used as a level sensor, which signals the receiver to shut off. This is done by either increasing or decreasing a pressure within the receiver. Thus, pressurization of the tank may not be necessary. Jet sensors are used as level sensing devices due to their simplicity and reliability. In other cases, float style level sensors are used. However since float sensor have moving parts, they are prone to failure in some cases.

In another embodiment of the invention, a pilot valve operated receiver is designed to support automatic shut-off refueling of vehicles, such as off road vehicles. It allows a high rate of fueling, up to 180 gallons per minute (GPM) in some cases, without pressurizing the vehicles' fuel tank. It ensures complete filling of the fuel tank without overfill. The tank will fill until the fuel level reaches the level of a sensor, such as a jet sensor, and no more. In some embodiments of the invention, the receiver is prevented from being manually overridden (forced to open after the fuel level has reached the jet sensor) by keeping the nozzle open.

An embodiment of the present inventive apparatus is illustrated in FIG. 1. A refueling system using a receiver 1, such as a MGR180A receiver, provides high flow refueling with an automatic shut off. The refueling system includes three main components, a nozzle 2, the receiver 1, and a sensor 3, which could be a jet sensor. Nozzle 2 is attached to a line 4 from the fuel pumps and remains at the fueling station or with the fueling truck. The receiver 1 and sensor 3 can be in some embodiments of the invention permanently mounted on the vehicle being refueled.

In operation, the nozzle 2 is connected to the receiver 1 and opens the poppet valve 7 in the receiver 1. A small portion of the flow through the receiver 1 is directed through the sensor 3 that is located near the top of the fuel tank 5. As the tank 5 fills, sensor 3 provides pressure back to the receiver 1 keeping its' control valve piston 8 open, allowing the main flow into the tank 5. When the fluid level in the tank reaches the jet sensor 3, it interrupts the pressure back to the receiver 1, which causes the control valve piston 8 to close.

Figure 2:
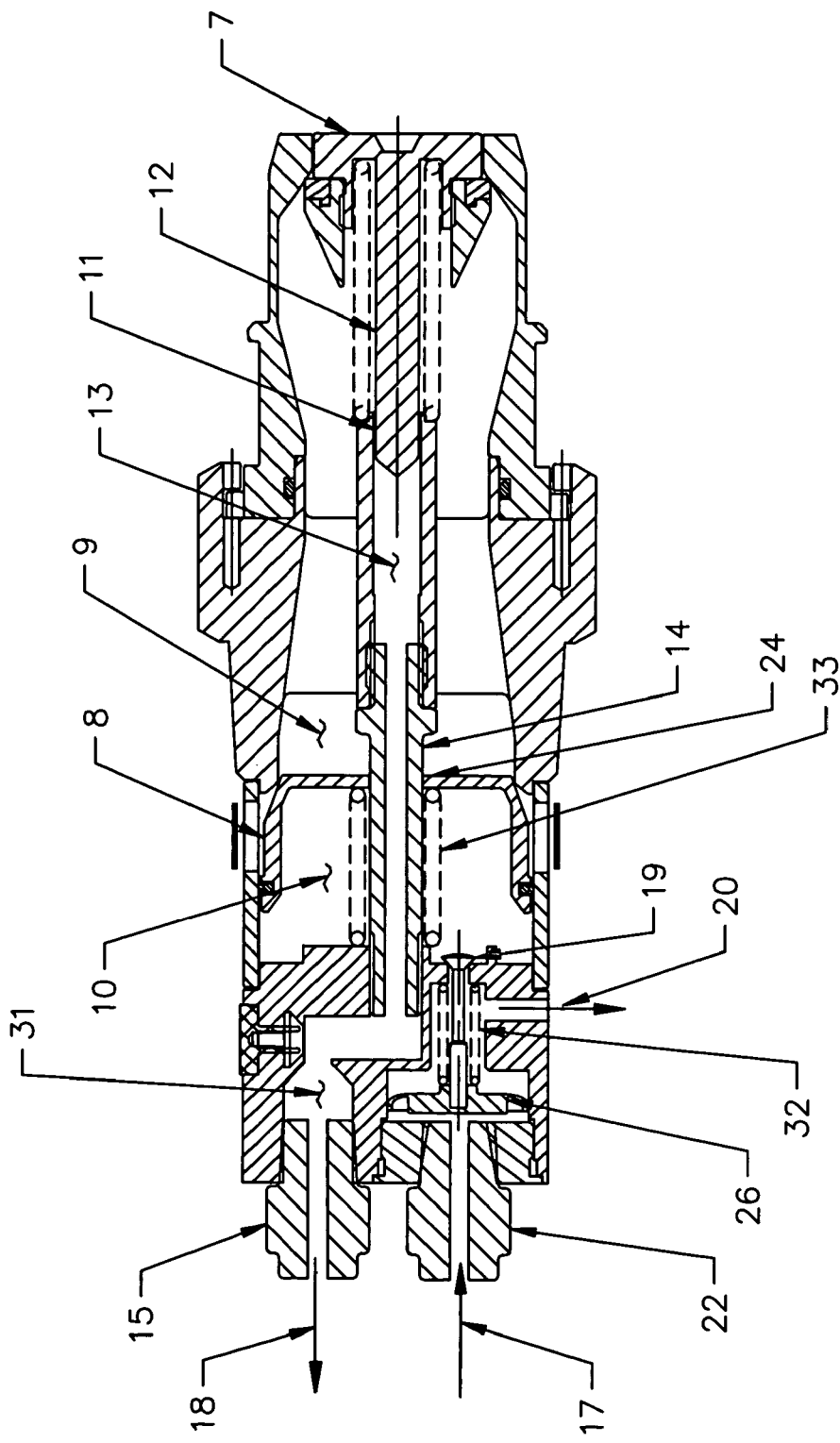
FIG. 2 is an illustration of a receiver of the present invention in a closed position.

FIG. 2 is an illustration of receiver 1 in a closed position. The receiver has a poppet valve 7 and a control valve 8. When poppet valve 7 is in an open position, it allows flow from the inlet at poppet valve 7 to control valve 8. The control valve 8 has an inlet side, area 9 and an outlet side, area 10.

There is a clearance 11 between poppet valve shaft 12 and main body bore 13 into the connecting rod 14. The flow from the main body bore 13 is guided through to outlet fitting 15. Return flow 17 is directly affected by flow 18 coming from outlet fitting 15. If the return flow 17 is great enough, pilot valve 19 can be pushed into an open state. A flow 20 is provided to allow flow out of receiver 1.

Return flow 17 is received through return fitting 22. A clearance 24 between control valve 8 and connecting rod 14 allows for flow to come from area 9 to area 10. A pilot valve diaphragm 26 is connected to pilot valve 19.

Figure 3:
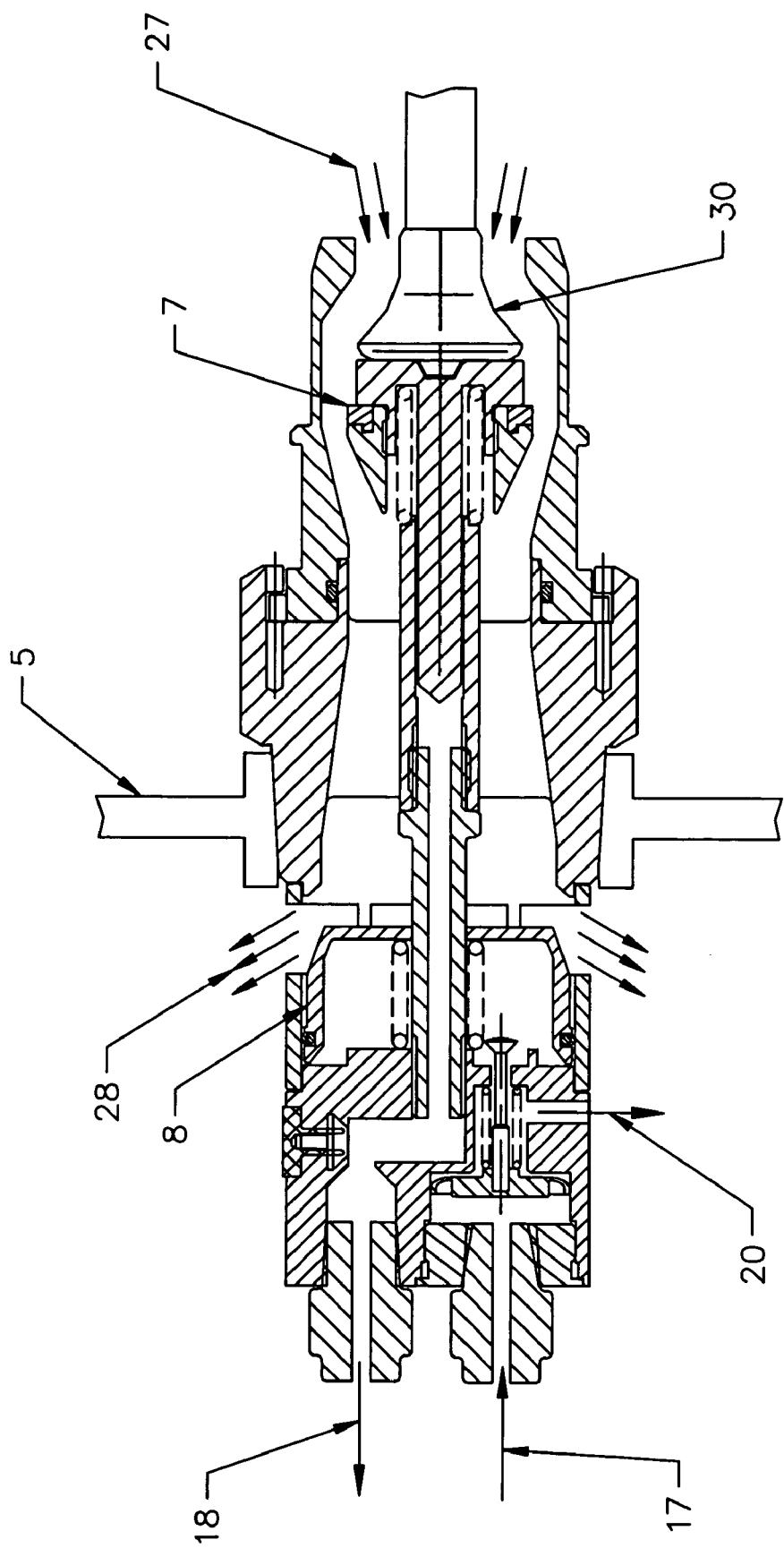
FIG. 3 is an illustration of a receiver of the present invention in an open position.

FIG. 3 is an illustration of receiver 1 in the open position. In the open position an inlet flow 27 is allowed to enter the receiver through the inlet. The flow is guided through receiver 1 through outlet fitting 15 as a flow 18 and back through return fitting 22 as return flow 17. Return flow 17 exerts enough pressure on pilot valve diaphragm to open pilot valve 19. This allows pressure in area 10 to escape through flow 20 creating a pressure differential between area 9 and area 10. This pressure differential help enable valve piston 8 to be put into an open position allowing flow 28 out of receiver 1.

A pilot valve spring 32 is located between pilot valve 19 and pilot valve diaphragm 26. These element can be configured so that a relatively low return flow 17 pressure will override the pilot valve spring 32 and open the pilot valve 19. A spring 33 can be used with control valve piston 8 to assist as a bias in moving control valve piston 8 into an open or closed position.

The automatic shut off feature of receiver 1 is accomplished by controlling the pressure differential across the control valve piston 8. When the pressure in area 10 is ≧than the pressure in area 9, the control valve 8 will close. Note that there is a larger pressure area on the area 10 side than the area 9 side of the control valve piston 8 in the closed position.

When area 9 pressure is >>than area 10 pressure, the control valve piston 8 will open allowing full flow out 28 of the receiver 1 into the tank 5. As the nozzle 2 is opened, the nozzle poppet 30 opens the receiver poppet valve assy 7. Inlet flow 27 from the nozzle 2 enters the receiver 1. Area 9 pressure momentarily rises to the deadhead pressure of the fuel pumping system (Area 10 pressure is basically 0 for an instant). The fuel pressure leaks through the clearance 24 between the control valve piston 8 and the connecting rod 14, making area 10 pressure=area 9 pressure.

At the same time, fuel is also flowing through the clearance 11 between the poppet valve shaft 12 and the main body bore 13 into the connecting rod 14 through the control cap output bore 31 and out the fitting 15. The flow 18 from the fitting 15 goes to the input 36 of the jet sensor 3. When the tank level is low the jet sensor allows uninterrupted flow 17 from the output 37 of the jet sensor 3 back to the receiver return fitting 22. The pressure of flow 17 pushes against the pilot valve diaphragm 26 and opens the pilot valve 19. The pilot valve 19 is in area 10 and, when open, permits flow 20 out of area 10 into the tank 5. This drops area 10 pressure to tank 5 pressure resulting in the area 9 pressure >>than area 10 pressure condition, allowing the control valve piston 8 to open. Note that the pressure area of the pilot valve diaphragm 26 is much larger than the pilot valve 19. This allows for a relatively low return flow 17 pressure to override the pilot valve spring 32 and open the pilot valve 19.

The foregoing steps happen quickly, almost simultaneously. As long as the flow 35 through the jet sensor 3 is uninterrupted, the return flow 17 will hold the pilot valve 19 open which keeps the control valve piston 8 in the open position allowing full fuel flow 28 into the tank 5. When the fuel level 6 reaches the jet sensor 3, it will interrupt the flow 35 across the jet sensor 3 and substantially lower the return flow 17 pressure to the pilot valve diaphragm 26. The pilot valve spring 32 now overrides return flow 17 pressure, allowing the pilot valve spring 32 to close the pilot valve 19.

With the pilot valve 19 closed, area 10 pressure now increases until it is ≧area 9 pressure, causing the control valve piston 8 to close shutting off flow 28 into the tank 5. The receiver 1 is now closed to the tank 5 even thought it is still connected to the open nozzle 2.

Area 10 pressure can become greater than area 9 pressure because the portion of area 10 pressure that acts against the control valve piston 8 surface consists mainly of dynamic pressure, while Area 10 pressure is completely static and equals the total pressure.

The total pressure is the sum of both the static and dynamic elements of fluid pressure. Before the control valve piston 8 closure, area 9 pressure still has both static and dynamic elements. (The control valve piston 8 also has a spring 33 assist as bias, but the receiver could work without the spring 33.) Once the control valve piston 8 is closed, both areas become completely static so area 10 pressure=area 9 pressure. When closed there is a larger pressure area on the area 10 side than on the area 9 side so that when these pressures are equal, the control valve piston 8 will be kept closed. This is regardless of whether the nozzle 1 is in the open or closed position, therefore the receiver cannot be overridden.

Figure 4:
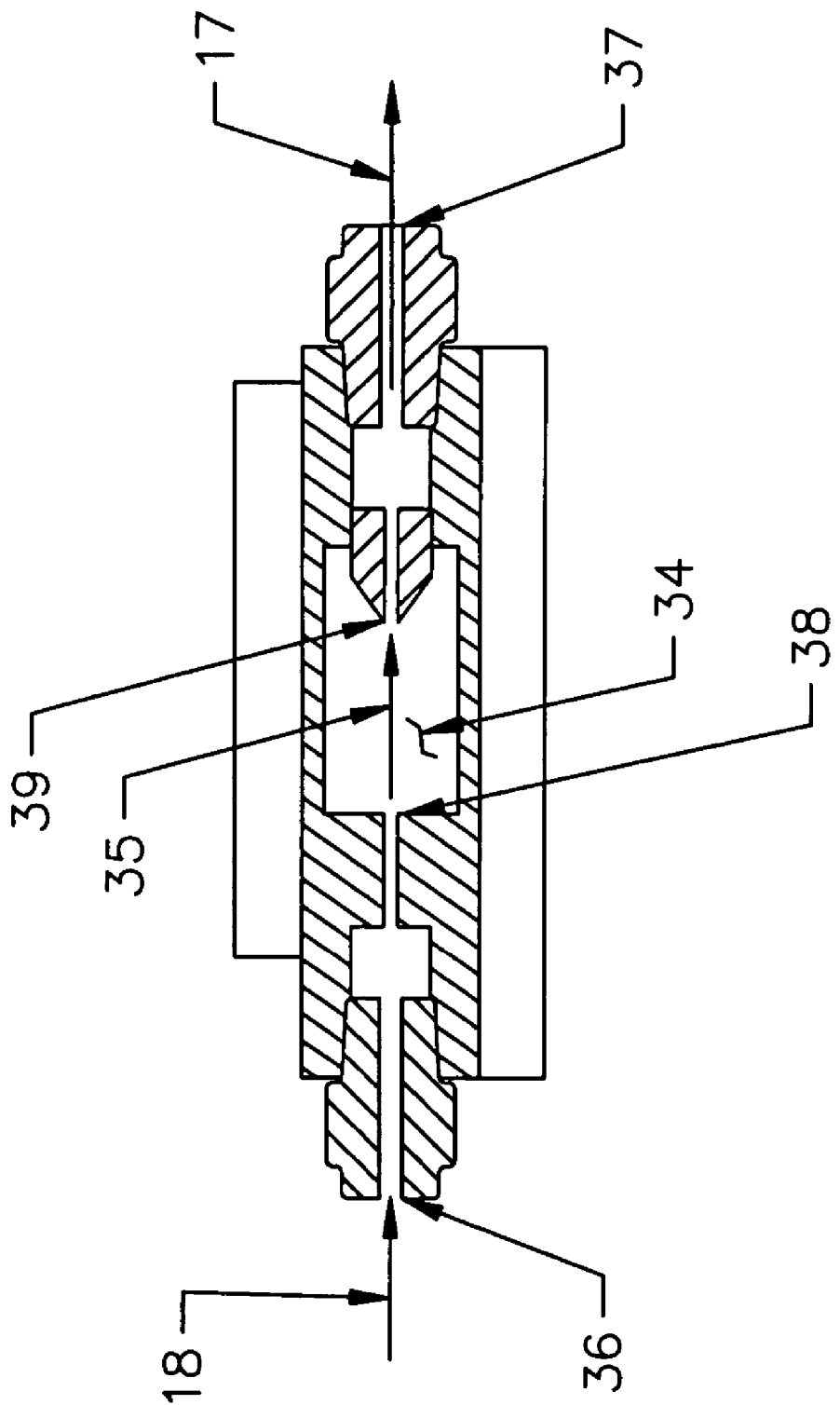
FIG. 4 is an illustration of a jet senor of the present invention.

FIG. 4 is an illustration of a jet sensor 3 that has two flow orifices in series. The flow 18 from receiver 1 goes to the inlet orifice 38 on the jet sensor 3 and flows 35 across an open space 34 to the outlet orifice 39 and back to receiver 1. This return flow 17 is the pressure signal that keeps the receiver 1 open and filling the tank 5.

As the fuel level 6 increases to the level of the jet sensor 1, it covers the open space 34 between the orifices and interrupts the flow 35 into the outlet orifice 39. This greatly reduces the pressure of the return flow 17 back to the receiver 1, which causes it to close as previously described The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A refueling receiver comprising:
   an inlet configured to receive a nozzle;
   a control valve piston connected to said inlet to allow flow from said inlet to said control valve piston, said control valve piston having an inlet side and an outlet side;
   an outlet comprising an outlet fitting and a return fitting, said outlet fitting connected to said inlet to allow flow from said inlet to said outlet fitting, and said return fitting connected to said outlet fitting to allow flow from said outlet fitting to said return fitting, wherein said return fitting is connected to said outlet fitting through a sensor; and
   a pilot valve in communication with said return fitting to control a pressure differential between said inlet side and said outlet side to move said control valve piston into a first position to allow flow out of the receiver, and a second position to prevent flow from leaving the receiver.

2. The refueling receiver as recited in claim 1 wherein said sensor comprises a jet sensor.

3. The refueling receiver as recited in claim 1, said sensor comprising:
   an input connected to said outlet fitting; and
   an output connected to said return fitting.

4. The refueling receiver as recited in claim 1 further comprising a connecting rod forming a main body bore connecting said inlet to said outlet fitting.

5. The refueling receiver as recited in claim 1 wherein said pilot valve is in communication with said outlet side so that flow from the return fitting moves said pilot valve releasing pressure from said outlet side.

6. A refueling receiver comprising:
   an inlet configured to receive a nozzle;
   a control valve piston connected to said inlet to allow flow from said inlet to said control valve piston, said control valve piston having an inlet side and an outlet side;
   an outlet comprising an outlet fitting and a return fitting, said outlet fitting connected to said inlet to allow flow from said inlet to said outlet fitting;

a sensor having an input connected to said outlet fitting, and an output connected to said return fitting to allow flow from said outlet fitting to said return fitting through said sensor; and a pilot valve in communication with said return fitting to control a pressure differential between said inlet side and said outlet side to move said control valve piston into a first position to allow flow out of the receiver, and a second position to prevent flow from leaving the receiver.

7. The refueling receiver as recited in claim 6 further comprising a connecting rod forming a main body bore connecting said inlet to said outlet fitting.

* * * * *